Figure 1:
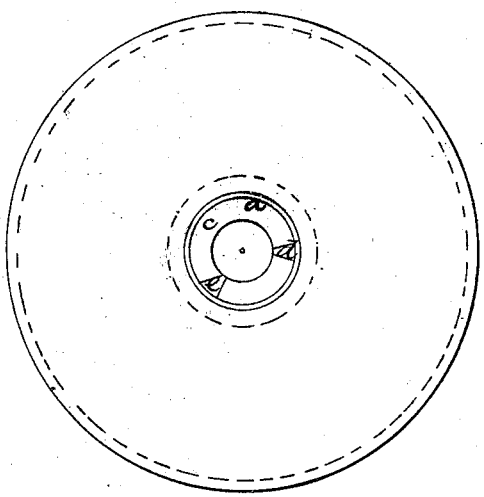
Figure 2:
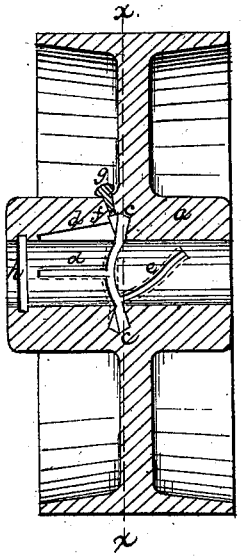

D. Harrington,
Lubricating Band Pulleys.
N° 79,752.   Patented July 7, 1868

Witnesses:
S. B. Kidder
M. W. Frothingham

Inventor:
D. Harrington
by his Attys
Cooley Halstead & Gruber

United States Patent Office.

DAVID HARRINGTON, OF WORCESTER, ASSIGNOR TO HIMSELF AND S. A. WOODS, OF BOSTON, MASSACHUSETTS.

*Letters Patent No. 79,752, dated July 7, 1868.*

IMPROVEMENT IN LUBRICATING PULLEYS.

The Schedule referred to in these Letters Patent and making part of the same.

TO ALL WHOM IT MAY CONCERN:

Be it known that I, DAVID HARRINGTON, of Worcester, in the county of Worcester, and State of Massachusetts, have invented an Improved Self-Oiling Loose Pulley; and I do hereby declare that the following, taken in connection with the drawings which accompany and form part of this specification, is a description of my invention sufficient to enable those skilled in the art to practise it.

My invention relates to the construction of a loose pulley, with reference to provision for keeping the bearing of such pulley lubricated, by combining with the hub an oil-containing reservoir, and means for keeping the oil supplied to the bearing-surface of the hub from such reservoir, and for reconveying the surplus oil from such surface back to the reservoir.

My invention consists in coring out around the bearing-surface of the hub an annular chamber, opening into the bore, in the form of a narrow, continuous mouth, and extending back from the bore, enlarging as it retreats, thereby making an oil-chamber of considerable capacity, to the back or enlarged part of which the oil is thrown by centrifugal force as the pulley is rotated, while, when the pulley stops, the oil settles down to the lowest part of the chamber, and overflowing such part, penetrates between the shaft and bearing-surface of the hub to the whole length of the hub, so that as the pulley next revolves the whole surface is lubricated.

I prefer, however, to use, in connection with this annular chamber, lateral oil-ducts leading out therefrom, nearly to the opposite ends of the hub, these ducts being either straight, (or parallel with the axis,) or diagonal, and each duct opening upon the shaft, and widening back therefrom, and being largest where it opens into the main oil-chamber.

The drawing represents a pulley embodying my improvements.

A shows a central cross-section of the pulley.

B, a section on the line $x\ x$.

$a$ denotes the hub, cast whole, or with the bearing-surface integral therewith. In the bearing-surface of the hub, preferably near the centre thereof, I core out the chamber $c$, extending entirely around the hub, this chamber being narrow at its mouth, or where it opens on the bearing-surface $b$, and extending quite deeply into the hub, widening as it extends back, as seen at A, it being thus made capable of receiving and holding a considerable quantity of oil, which is thrown to the back surface of the chamber by centrifugal force as the pulley rotates, while, when the pulley is at rest, the oil settles down into the lowermost part of the channel, and running over the opening of the same against the shaft, penetrates between the shaft and the bearing-surface on each side of the channel, and thus causes the whole shaft to be kept lubricated, as will be readily understood.

Out of each side of the channel one or more grooves or oil-ducts extend, such grooves being either straight, (or parallel with the bearing,) as seen at $d$, or inclined, as seen at $e$.

Each of these ducts is made shallow, and narrow at its outer end, and increases in depth and width from such end to its union with the main chamber $c$, as seen at B, and the ducts are filled with wool, or other fibre or fibrous material, which by capillary attraction is saturated, and thereby keeps the shaft lubricated the whole length of the hub.

As the shaft revolves at speed, any excess of oil is thrown, by centrifugal action, to the parts of the ducts $d\ e$ that are farthest from the axis of the hub, or, in other words, is thrown towards and into the main chamber, from which it is redistributed by the wool or saturated fibre in the ducts, and by the overflow of the oil each way from the chamber $c$ when the pulley stops.

By this means the whole bearing-surfaces of the pulley and shaft are kept well lubricated, but not excessively so, or without waste of oil, and with a minimum quantity thereof, the circulation of the oil being kept up by the rotation of the shaft, and being kept within bounds by centrifugal force.

The main oil-chamber $c$ may run diagonally around the hub, but I generally prefer to run it straight, or nearly straight, or parallel with the ends of the hub.

The chamber $c$ is supplied with oil through a suitable inlet, $f$, closed by a stopper, $g$.

Each lateral duct, or any one or more of them, may connect at its outer end with a groove, $h$, extending around the bearing-surface near the end of the hub, this groove intercepting any oil which may incline to flow endwise beyond the ducts, such oil being by means of such groove and ducts reconveyed to the main oil-chamber, and kept from flowing beyond the bearing.

I claim, in combination with the hub of a loose pulley, an annular chamber, extending continuously around the hub, and opening all around into the bearing-surface thereof, this chamber being cored out in casting, and being narrow at the bearing-surface, and enlarging back therefrom, substantially as shown and described.

I also claim, in combination with the oil-chamber $c$, the lateral ducts, made shallow at their outer ends, and deepening and widening towards and into the main chamber $c$, substantially as described.

I also claim, in combination with the main annular chamber $c$ and the lateral duct or ducts, an end groove, $h$, connecting with the lateral duct or ducts, substantially as shown and described.

DAVID HARRINGTON.

Witnesses:
E. B. STODDARD,
M. B. GOODELL.